US010863042B2

(12) United States Patent
Kawano

(10) Patent No.: US 10,863,042 B2
(45) Date of Patent: Dec. 8, 2020

(54) INFORMATION PROCESSING APPARATUS AND DISPLAY METHOD

(71) Applicant: SHARP KABUSHIKI KAISHA, Sakai (JP)

(72) Inventor: Shinichi Kawano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/387,337

(22) Filed: Apr. 17, 2019

(65) Prior Publication Data

US 2019/0327371 A1 Oct. 24, 2019

(30) Foreign Application Priority Data

Apr. 18, 2018 (JP) .................... 2018-080212

(51) Int. Cl.
*G06F 3/048* (2013.01)
*H04N 1/00* (2006.01)

(52) U.S. Cl.
CPC ..... *H04N 1/00413* (2013.01); *H04N 1/00411* (2013.01)

(58) Field of Classification Search
CPC ......... H04N 1/00413; H04N 1/00427; H04N 1/00411

USPC ............... 358/1.15; 399/13, 81; 715/810
See application file for complete search history.

(56) References Cited

U.S. PATENT DOCUMENTS

2006/0031766 A1* 2/2006 Minagawa ............ G06F 3/1205
715/705
2019/0037087 A1* 1/2019 Kawaguchi ........ H04N 1/00503

FOREIGN PATENT DOCUMENTS

JP 2011-258216 A 12/2011

* cited by examiner

*Primary Examiner* — Jamares Q Washington
(74) *Attorney, Agent, or Firm* — ScienBiziP, P.C.

(57) ABSTRACT

Provided is an information processing apparatus that displays, in a favorite list, one or more "favorites" by which one or more functions that are able to be provided by a multifunction apparatus alone or a combination of the multifunction apparatus and one or more optional apparatuses connected to the multifunction apparatus are collectively selected, in which whether or not each of the one or more "favorites" is executable is determined on a basis of a connection state, to the multifunction apparatus, of each of the one or more optional apparatuses that provide one or more functions selected by each of the one or more "favorites" and, in the favorite list, a "favorite" that is executable is displayed so as to be selectable and a "favorite" that is not executable is not displayed.

26 Claims, 19 Drawing Sheets

FIG. 3

| APPARATUS | FUNCTION | FUNCTION | FUNCTION | FUNCTION |
|---|---|---|---|---|
| MAIN BODY | SINGLE-SIDED PRINTING | DOUBLE-SIDED PRINTING WITH LONG-SIDE BINDING | DOUBLE-SIDED PRINTING WITH SHORT-SIDE BINDING | SADDLE STICH PRINTING |
| POST-PROCESSING APPARATUS J | STAPLE ONE-PORTION BINDING | | | |
| POST-PROCESSING APPARATUS K | STAPLE ONE-PORTION BINDING | STAPLE TWO-PORTION BINDING | SADDLE STITCH STAPLING | |

FIG. 4

| NAME OF FAVORITE | SETTING ITEM A | SETTING ITEM B | SETTING ITEM C | ... | SETTING ITEM Z | DISPLAY/NON-DISPLAY |
|---|---|---|---|---|---|---|
| DEFAULT | SINGLE-SIDED | — | — | ... | — | DISPLAY |
| DOUBLE-SIDED | DOUBLE-SIDED PRINTING WITH LONG-SIDE BINDING | — | — | ... | — | DISPLAY |
| BOOK BINDING | SADDLE STICH PRINTING | SADDLE STICH STAPLING | — | ... | — | DISPLAY |

FIG. 5

| NAME OF FAVORITE | SETTING ITEM A | SETTING ITEM B | SETTING ITEM C | ... | SETTING ITEM Z | DISPLAY/ NON-DISPLAY |
|---|---|---|---|---|---|---|
| DEFAULT | SINGLE-SIDED | — | — | ... | — | DISPLAY |
| DOUBLE-SIDED | DOUBLE-SIDED PRINTING WITH LONG-SIDE BINDING | — | — | ... | — | DISPLAY |
| BOOK BINDING | SADDLE STICH PRINTING | SADDLE STICH STAPLING | — | ... | — | NON-DISPLAY |

FIG. 9

| OPTIONAL APPARATUS | CONNECTION STATE |
|---|---|
| POST-PROCESSING APPARATUS J | NOT CONNECTED |
| POST-PROCESSING APPARATUS K (SADDLE FINISHER) | CONNECTED |

INFORMATION PROCESSING APPARATUS AND DISPLAY METHOD

BACKGROUND

1. Field

The present disclosure relates to an information processing apparatus and a display method that display a "favorite" by which one or more functions provided by an apparatus are collectively selected.

2. Description of the Related Art

In recent years, with widespread use of an information processing apparatus (personal computer), an image output apparatus that performs output processing of image data transmitted from the information processing apparatus has become widely used. As the image output apparatus, there are a printer that has only a printing function and a multifunction apparatus that has, in addition to the printing function, a data transmission function such as a scanner function, a fax transmission function, or an e-mail transmission function. The multifunction apparatus may be used alone or used in combination with an optional apparatus (such as a multifunction peripheral) connected thereto.

Such image output apparatuses are usually connected to a network such as a LAN in a wired or wireless manner, and at an office or the like, a plurality of image output apparatuses are installed at a plurality of locations.

By considering the locations at which image output apparatuses are installed and functions provided by the image output apparatuses, a user selects an image output apparatus to use, saves a function, which is often set in the image output apparatus, as "favorite" setting, and performs printing by selecting the "favorite" setting.

In the related art, in a printer driver for the multifunction apparatus, a "favorite" that enables a user to collectively select one or more functions that are able to be provided by a multifunction apparatus main body and an optional apparatus connected thereto is able to be set. When the user performs an operation of selecting functions that the user desires to use collectively and naming the functions to save as a "favorite", the printer driver displays the saved "favorite" in a favorite list so as to be selectable after that.

When the user selects a desired "favorite" from the favorite list, functions of the multifunction apparatus and the optional apparatus connected thereto, which are associated with the "favorite", are used and the user is able to obtain a desired printed matter.

Meanwhile, in the related art, not only a "favorite" in which only a usable function is set but also a "favorite" which includes setting of a function that is not usable, for example, because of detachment of the optional apparatus from the multifunction apparatus main body is displayed to be selectable in the favorite list.

In a case where the user selects the "favorite" including setting of the unusable function, however, the printer driver automatically adjusts the setting, and therefore it is difficult for the user to use a function as expected. Here, the adjustment of setting refers to replacement of a function with another function or omission of the function.

Japanese Unexamined Patent Application Publication No. 2011-258216 discloses a technique of turning off usage of an option in a case where a selected "favorite" is not executable.

When it is difficult to obtain a printed matter which is able to be obtained by using a function selected by the "favorite" selected by the user, inconvenience may be caused to the user.

Thus, the disclosure provides an information processing apparatus and a display method by which, when a "favorite" that is not executable is caused due to a change in a connection state of an optional apparatus to a multifunction apparatus, erroneous selection of the "favorite" that is not executable in a favorite list is avoided.

SUMMARY

According to the disclosure, an information processing apparatus is provided. The information processing apparatus displays, in a favorite list, one or more "favorites" by which one or more functions are collectively selected, the one or more functions being able to be provided by a multifunction apparatus alone or a combination of the multifunction apparatus and one or more optional apparatuses connected to the multifunction apparatus, in which whether or not each of the one or more "favorites" is executable is determined, and a "favorite" that is executable is displayed in the favorite list so as to be selectable and a "favorite" that is not executable is not displayed in the favorite list.

According to the disclosure, an information processing apparatus is provided. The information processing apparatus displays, in a favorite list, one or more "favorites" by which one or more functions are collectively selected, the one or more functions being able to be provided by a multifunction apparatus alone or a combination of the multifunction apparatus and one or more optional apparatuses connected to the multifunction apparatus, in which whether or not each of the one or more "favorites" is executable is determined, and a "favorite" that is executable is displayed in the favorite list so as to be selectable and a "favorite" that is not executable is displayed in the favorite list so as not to be selectable and so as to be distinguished from the "favorite" that is executable.

According to the disclosure, a display method is provided. The display method displays, in a favorite list, one or more "favorites" by which one or more functions are collectively selected, the one or more functions being able to be provided by a multifunction apparatus alone or a combination of the multifunction apparatus and one or more optional apparatuses connected to the multifunction apparatus, and the display method includes determining whether or not each of the one or more "favorites" is executable on a basis of a connection state, to the multifunction apparatus, of each of the one or more optional apparatuses that provide one or more functions selected by each of the one or more "favorites" and displaying, in the favorite list, a "favorite" that is executable so as to be selectable and not displaying, in the favorite list, a "favorite" that is not executable.

According to the disclosure, a display method is provided. The display method displays, in a favorite list, one or more "favorites" by which one or more functions are collectively selected, the one or more functions being able to be provided by a multifunction apparatus alone or a combination of the multifunction apparatus and one or more optional apparatuses connected to the multifunction apparatus, and the display method includes determining whether or not each of the one or more "favorites" is executable, and displaying, in the favorite list, a "favorite" that is executable so as to be selectable and displaying, in the favorite list, a "favorite" that is not executable so as not to be selectable and so as to be distinguished from the "favorite" that is executable.

According to the disclosure, a storage medium is provided in which a program causing the aforementioned information processing apparatus to function as the information processing apparatus is stored.

BRIEF DESCRIPTION OF THE DRAWINGS

FIG. 3 illustrates a configuration and a data example of a function table, according to the first embodiment of the disclosure;

FIG. 4 illustrates a structure of a favorite table and data when a post-processing apparatus is connected to a multifunction apparatus main body, according to the first embodiment of the disclosure;

FIG. 5 illustrates a structure of a favorite table and data when the post-processing apparatus is not connected to the multifunction apparatus main body, according to the first embodiment of the disclosure;

FIG. 9 illustrates a configuration and a data example of a connection state table, according to the first embodiment of the disclosure;

DESCRIPTION OF THE EMBODIMENTS

Hereinafter, embodiments and exemplary embodiments of the disclosure will be described with reference to accompanying drawings, which is provided for understanding of the disclosure. Note that, the embodiments and the exemplary embodiments as described below are examples in which the disclosure is specified, and are not characterized to limit the technical scope of the disclosure.

First Embodiment

Figure 1:
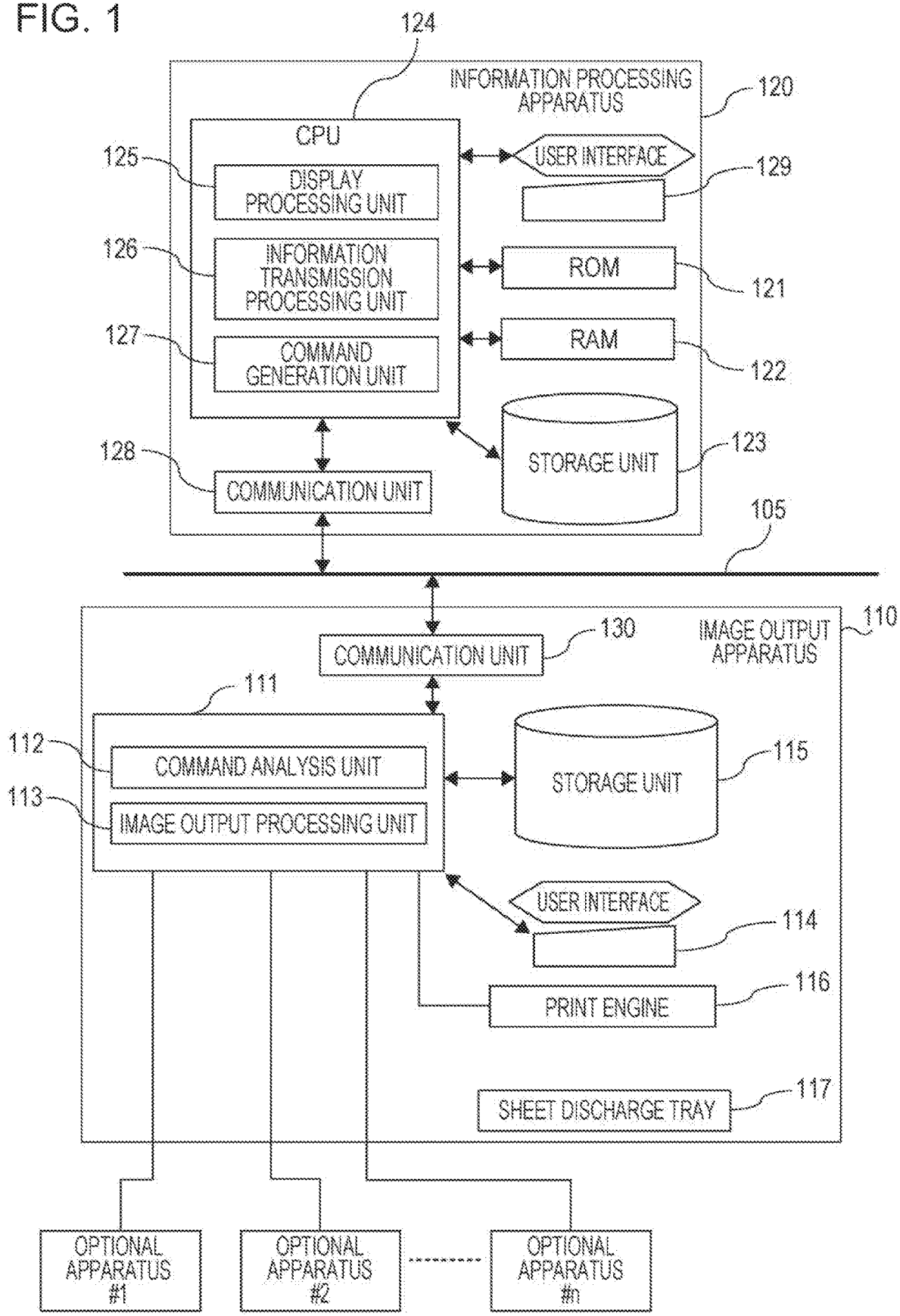
FIG. 1 is a functional block diagram illustrating configurations of an image output apparatus and an information processing apparatus connected thereto, according to a first embodiment of the disclosure.

FIG. 1 is a functional block diagram of an information processing apparatus 120 and an image output apparatus 110. First, the information processing apparatus 120 will be described.

The information processing apparatus 120 includes a ROM 121, a RAM 122, a storage unit 123, a CPU 124, a communication unit 128, and a user interface 129.

The CPU 124 includes a display processing unit 125, an information transmission processing unit 126, a command generation unit 127. Note that, functions of the units included in the CPU 124 are able to be implemented when the CPU 124 reads a program from a storage medium, such as the ROM 121 or the storage unit 123, and executes the program. During execution, the program is temporarily stored in the RAM 122 in some cases.

The information processing apparatus 120 of the present embodiment generates a print job by the command generation unit 127 and transmits the print job from the communication unit 128 via the information transmission processing unit 126 to the image output apparatus 110 capable of processing the print job.

The storage unit 123 is a memory constituted by an HDD or the like.

The CPU 124 is configured so as to execute a program stored in the ROM 121 or the RAM 122 and use the RAM 122 as a working area.

The communication unit 125 transmits the print job, which is generated by the command generation unit 127, to the target image output apparatus 110 via a network 105. For the transmission of the print job, Line Printer Daemon protocol (LPR), File Transfer Protocol (FTP), or the like is usable.

The user interface 129 is constituted by a display device and instruction input devices such as a keyboard and a mouse.

On the other hand, the image output apparatus 110 includes a communication unit 130, a command analysis unit 112, an image output processing unit 113, a user interface 114, a storage unit 115, a print engine 116, and a sheet discharge tray 117.

The communication unit 130 receives the print job transmitted from the information processing apparatus 120.

The command analysis unit 112 analyzes a command of the print job and determines processing for a finished document or the like.

The image output processing unit 113 performs output processing of the received print job on the basis of setting decided by the command analysis unit 112. The image output processing unit 113 outputs the print job to the print engine 116 on the basis of information decided by the command analysis unit 112 and a printed matter is discharged from the sheet discharge tray 117.

The command analysis unit 112 and the image output processing unit 113 constitute a control unit 111. Though not particularly illustrated in the figure, the control unit 111 is configured so that a CPU executes a program stored in a ROM or a RAM and uses the RAM as a working area.

The storage unit 115 is a memory constituted by an HDD or the like.

The user interface 114 is constituted by a display device and instruction input devices such as a keyboard and a mouse.

Figure 2:
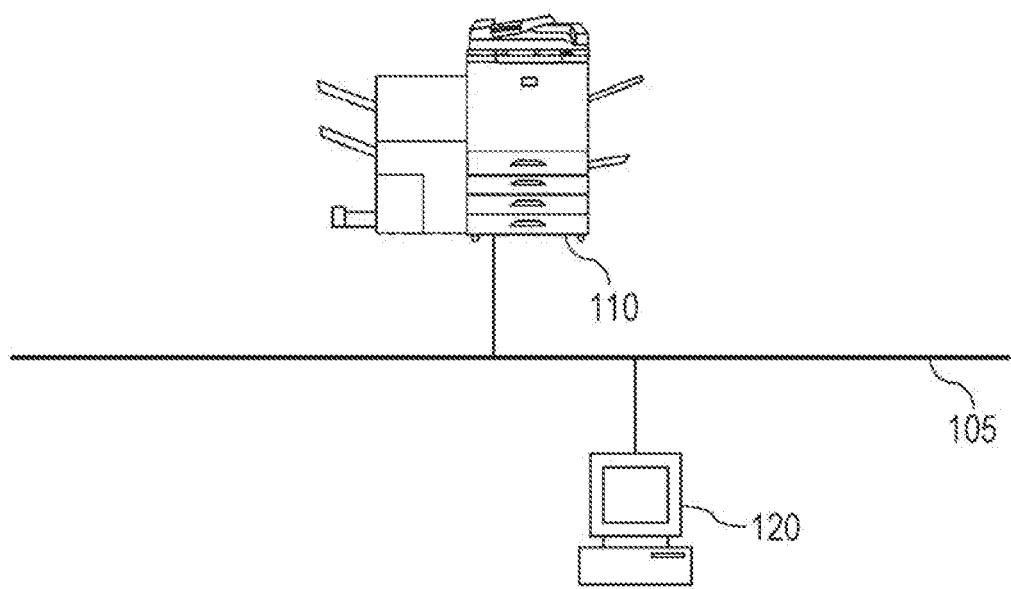
FIG. 2 is a conceptual diagram illustrating a state where the image output apparatus and the information processing apparatus are connected via a network, according to the first embodiment of the disclosure.

As illustrated in FIG. 2, in the image output apparatus for which the information processing apparatus 120 according to the embodiment of the disclosure assists image output, the information processing apparatus 120 is connected to the image output apparatus 110 via the network 105 such as the Internet or the intranet.

The network 105 is an IP network or the like such as the intranet/the Internet including a LAN, a wireless LAN, WiMAX, PLC, and c.link, and is also able to be connected to an external network.

The image output apparatus 110 is an image output apparatus that has at least a printing function, and examples thereof include a printer, a printer with a scanner function, and a multifunction apparatus.

In a case where the image output apparatus is a multifunction apparatus as illustrated in FIG. 1, various optional apparatuses #1 through # n are able to be connected thereto. For example, to the multifunction apparatus, a large capacity feeding device or the like is able to be connected as a sheet feeding optional apparatus, a large capacity tray is able to be connected as a kind of optional apparatus, an inner finisher, a finisher, a large capacity finisher, a saddle finisher, a large capacity saddle finisher, or the like is able to be connected as a sheet discharging optional apparatus (also referred to as a "post-processing apparatus").

With reference to FIG. 3, functions that are able to be provided by a main body and respective optional apparatuses will be described. Functions that are able to be provided by the main body are single-sided printing, double-sided printing with long-side binding (performing double-sided printing in a state where a long side of a printed matter corresponds to a back of a book), double-sided printing with short-side binding (performing double-sided printing in a state where a short side of a printed matter corresponds to a back of a book), saddle stich printing, and the like, a function that is able to be provided by a post-processing apparatus J is staple one-portion binding in FIG. 3, and functions that are able to be provided by a post-processing apparatus K (saddle finisher) are staple one-portion binding, staple two-portion binding, and saddle stich stapling as indicated in a corresponding row of FIG. 3.

The information processing apparatus 120 is an information processing apparatuses such as an information processing apparatus/AT compatible machine and a MAC-standard machine, and may be a terminal such as a portable terminal including a PDA or the like. A plurality of information processing apparatuses 120 each of which has a similar configuration and is connected to the network 105 may exist.

FIGS. 4 and 5 each illustrate a data structure of a favorite table.

In each record of the favorite table, a name of a "favorite" and names of one or more functions used in the "favorite" are saved in association with each other. Note that, in examples of FIGS. 4 and 5, names of functions are saved in fields of a setting item A, a setting item B, and . . . . Moreover, in a field of display/non-display in each record of the favorite table, a result of determination about whether or not a favorite is used is saved. In a case of a "favorite" that is usable, a value of the field is "display", and in a case of a "favorite" that is not usable, the value of the field is "non-display". While the "favorite" in which the value of the field is "display" is displayed so as to be selectable in a favorite list, the "favorite" in which the value of the field is "non-display" is not displayed so as to be selectable in the favorite list.

FIG. 4 indicates a case of "with post-processing apparatus (finisher)", and in this case, all "favorites" are able to be displayed ("display" is indicated in all fields of the "display/non-display"). FIG. 5 indicates a case of "without post-processing apparatus (finisher)", and in this case, saddle stich stapling is not allowed, and therefore "book binding" is not able to be displayed ("non-display" is indicated in the field of the "display/non-display").

Figure 6:
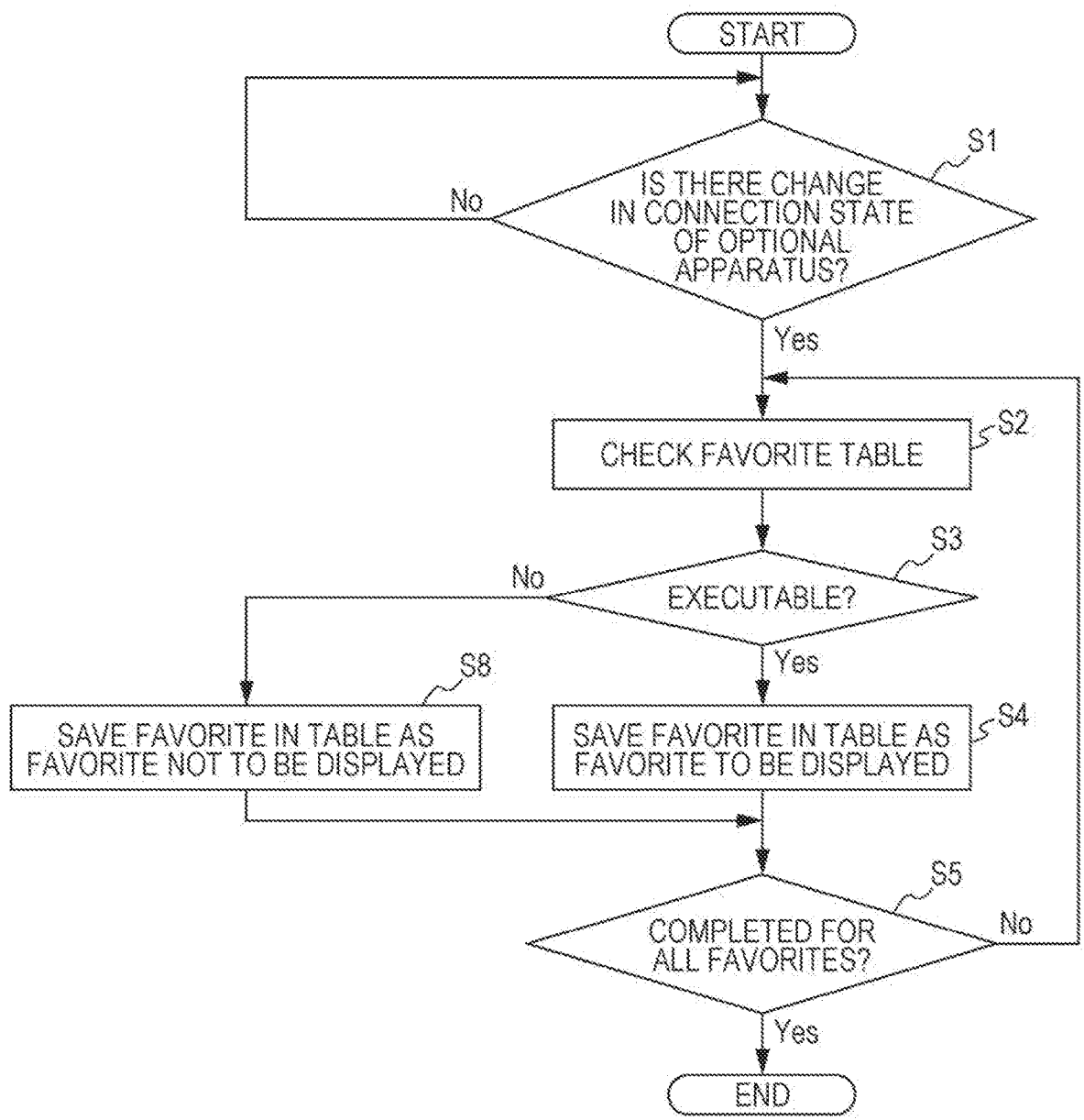
FIG. 6 is a flowchart for determining display/non-display of a "favorite", according to the first embodiment of the disclosure.

FIG. 6 is a flowchart for determining display/non-display of a "favorite".

Figure 7:
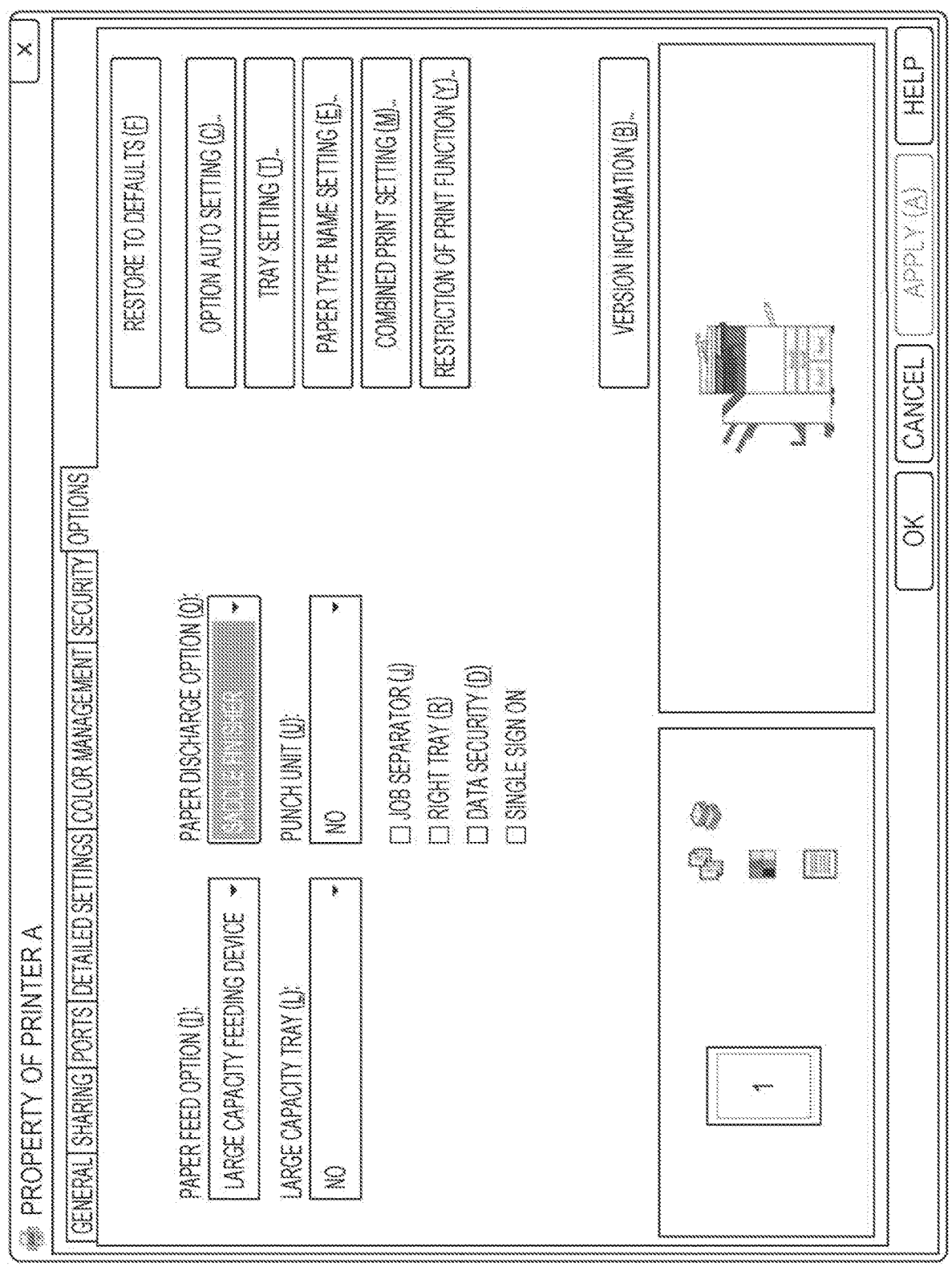
FIG. 7 illustrates a screen that is displayed by the information processing apparatus and indicates a connection state of an optional apparatus, in a case where a saddle finisher is connected as a paper discharge option, according to the first embodiment of the disclosure.
Figure 8:
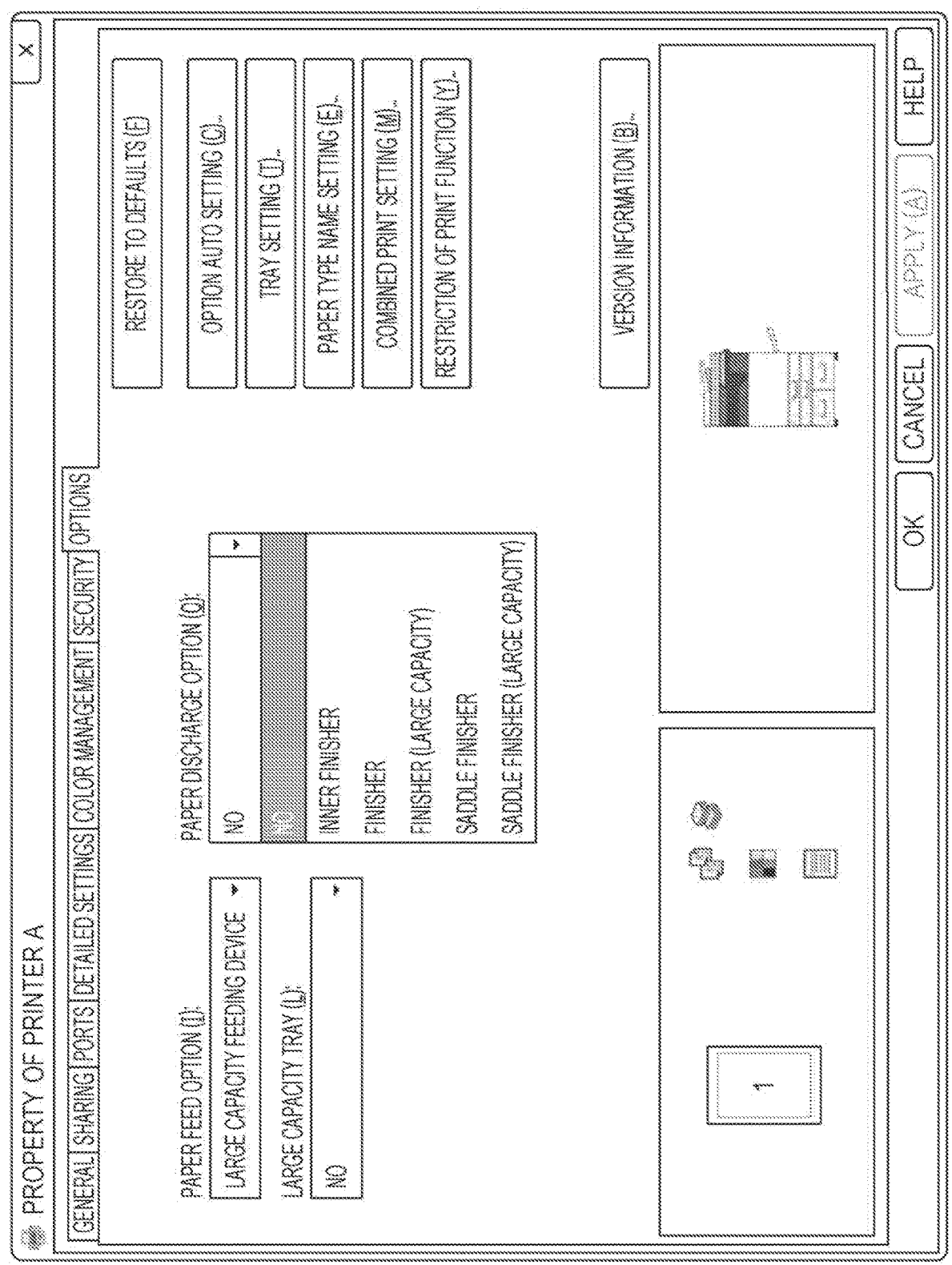
FIG. 8 illustrates a screen that is displayed by the information processing apparatus and indicates a connection state of an optional apparatus, in a case where nothing is connected as the paper discharge option, according to the first embodiment of the disclosure.

With reference to FIG. 6, in a case where there is a change in a connection state of an optional apparatus to the multi-function apparatus main body, for example, such as a change of a saddle finisher from an attached state to a detached state as illustrated in FIGS. 7 and 8 (YES at step S1), whether or not a first "favorite" in a favorite table is executable is determined (step S3), and when the "favorite" is executable (YES at step S3), the value of the "display/non-display" is set to "display" in order to display the "favorite" so as to be selectable (step S4), and when the "favorite" is not executable (NO at step S3), the value of the "display/non-display" is set to "non-display" in order not to display the "favorite" so as to be selectable (step S8).

The processing described above is repeated for all "favorites" in the favorite table (step S5).

Next, step S3 will be described in detail.

In a case where an optional apparatus is not connected to the multifunction apparatus main body, whether each of functions set to each of the favorites is able to be provided by the main body is checked. Alternatively, in a case where an optional apparatus is connected to the multifunction apparatus main body, whether each of the functions set to each of the favorites is able to be provided by the multi-function apparatus main body or the optional apparatus connected thereto is checked.

For example, a function included in a favorite with a name of "default" is "single-sided printing" (refer to FIGS. 4 and 5), and the function of the "single-sided printing" is able to be provided by the multifunction apparatus main body (refer to FIG. 3). Thus, even when an optional apparatus is not connected to the multifunction apparatus main body, the value of the field of the "display/non-display" of the favorite with the name of the "default" is "display" (refer to FIGS. 4 and 5).

A function included in a favorite with a name of "double-sided" is "double-sided printing with long-side binding" (refer to FIGS. 4 and 5). Thus, whether or not the post-processing apparatus J or the post-processing apparatus K is connected to the multifunction apparatus main body, the value of the field of the "display/non-display" of the favorite with the name of the "double-sided" is "display" (refer to FIG. 4).

Furthermore, functions included in a "favorite" with a name of "book binding" are "saddle stich printing" and "saddle stich stapling" (refer to FIGS. 4 and 5). Here, the function of the "saddle stich printing" is able to be provided by the multifunction apparatus main body (refer to FIG. 3). Moreover, the function of the "saddle stich stapling" is able to be provided by the post-processing apparatus K (refer to FIG. 3). Thus, in a case where the post-processing apparatus K is connected to the multifunction apparatus main body, the value of the field of the "display/non-display" of the favorite with the name of "book binding" is "display" (refer to FIG. 4), but in a case where the post-processing apparatus K is not connected to the multifunction apparatus, the value of the field of the "display/non-display" of the favorite with the name of the "book binding" is "non-display".

Note that, when the connection state is changed, a connection state table (refer to FIG. 9) is rewritten in accordance with the changed connection state. When checking whether a function included in a favorite is provided by the multifunction apparatus main body or the multifunction apparatus main body and an optional apparatus connected thereto, whether functions included in the "favorite" are functions registered in the function table is checked for an optional apparatus whose value of a field of a "connection state" is "connected" in the connection state table (refer to FIG. 9) and the multifunction apparatus main body.

Specifically, when no optional apparatus is connected to the multifunction apparatus main body, only the functions in the record of the "main body" of the function table are checked, and when the post-processing apparatus J is connected to the multifunction apparatus main body, the functions in the record of the "main body" and the "post-processing apparatus J" in the function table are checked, and when the post-processing apparatus K is connected to the multifunction apparatus main body, the functions in the record of the "main body" and the "post-processing apparatus K" in the function table are checked.

Figure 10:
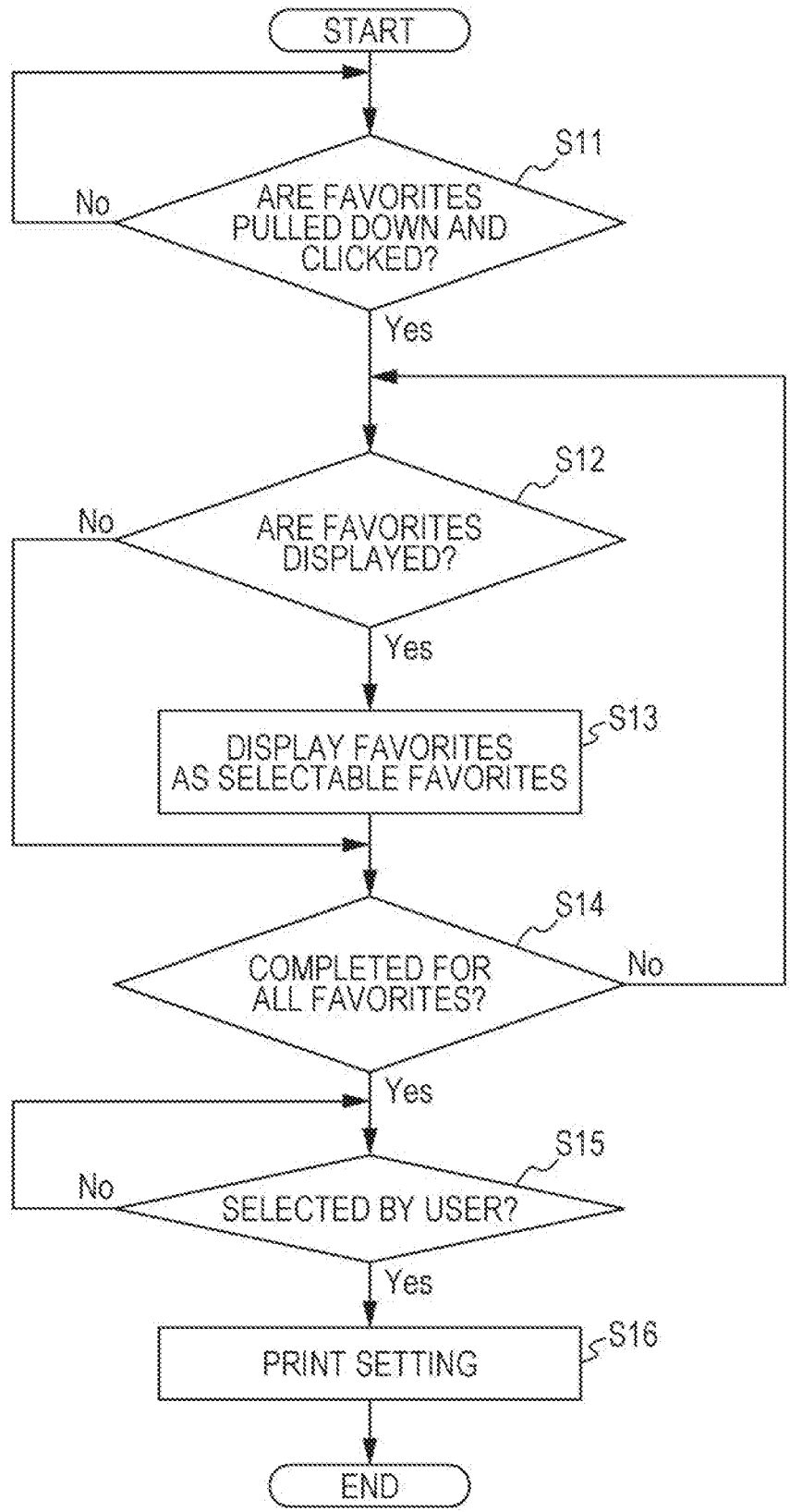
FIG. 10 is a flowchart for explaining an operation from when a favorite list is displayed till when setting corresponding to a selected favorite is set to the multifunction apparatus main body or the multifunction apparatus main body and an optional apparatus, according to the first embodiment of the disclosure.

Next, with reference to FIG. 10, an operation from when a favorite list is displayed till when setting corresponding to a selected favorite is set to the multifunction apparatus main body or the multifunction apparatus main body and an optional apparatus will be described.

In a case where an arrow mark for opening a favorite list is selected (YES at step S11), when all "favorites" that are registered indicate "display" as values of the "display/non-display" in a favorite table, the "favorites" are displayed so as to be selectable in the favorite list (steps S12, S13, and S14). When any of the "favorites" selectable in the favorite list is selected by a user (YES at step S15), setting corresponding to the selected "favorite" is set to the multifunction apparatus main body or the multifunction apparatus main body and the optional apparatus (step S16).

Next, a specific example of a favorite list in which a "favorite" is displayed will be described.

Figure 11:
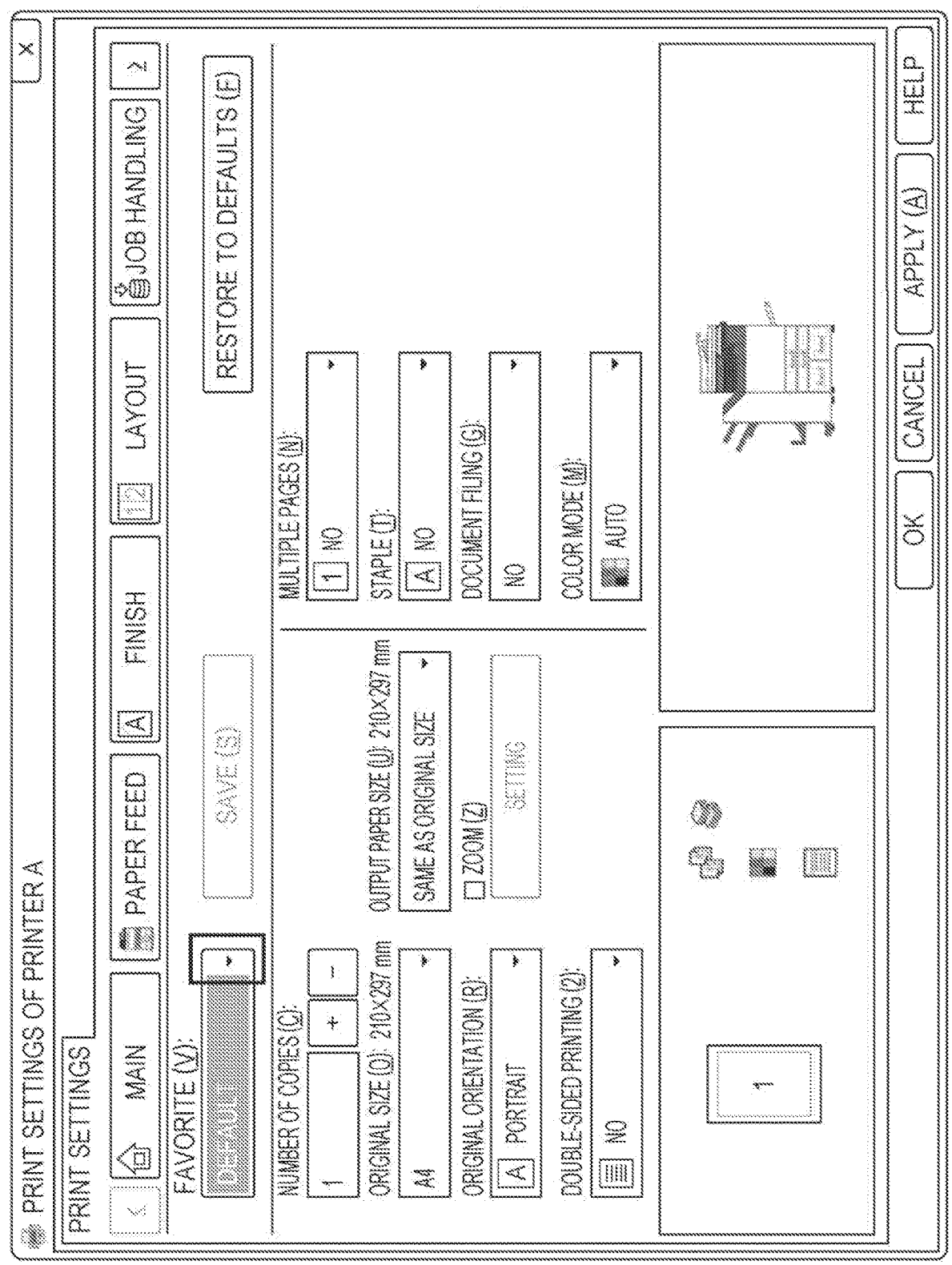
FIG. 11 illustrates a screen for print setting displayed by the information processing apparatus in a case where "default" is displayed as a "favorite" that is selectable in a favorite list, according to the first embodiment of the disclosure.

FIG. 11 illustrates default of the favorite list. In this state, only a favorite of "default" is displayed so as to be selectable in the favorite list.

Figure 12:
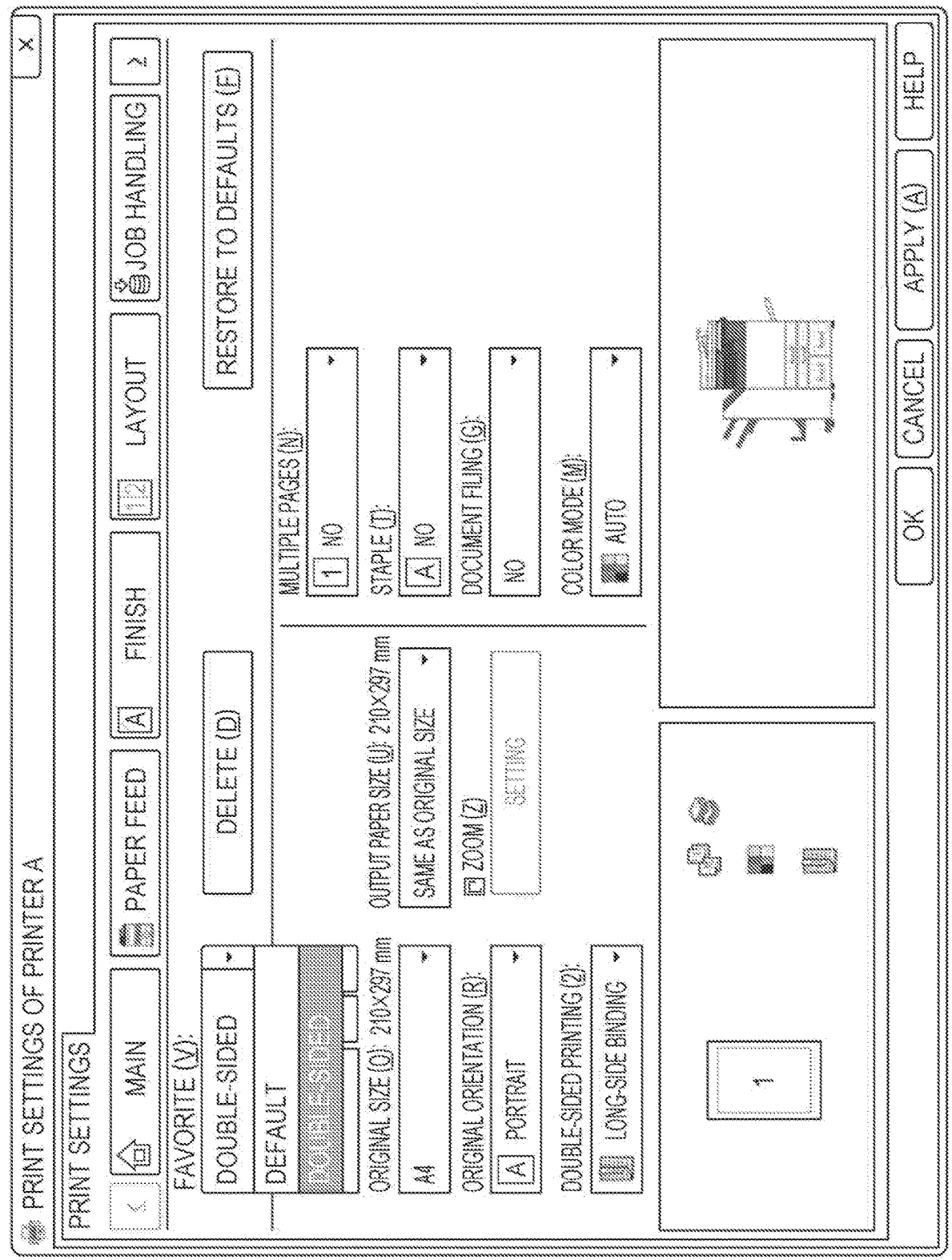
FIG. 12 illustrates a screen for print setting displayed by the information processing apparatus in a case where the "default" and "double-sided" are displayed as "favorites" that are selectable in the favorite list, according to the first embodiment of the disclosure.

FIG. 12 illustrates the favorite list obtained after attaching the post-processing apparatus K (saddle finisher) to the multifunction apparatus main body and then adding a favorite with a name of "double-sided". In this state, the favorite of the "default" and the favorite of the "double-sided" are displayed so as to be selectable in the favorite list.

Figure 13:
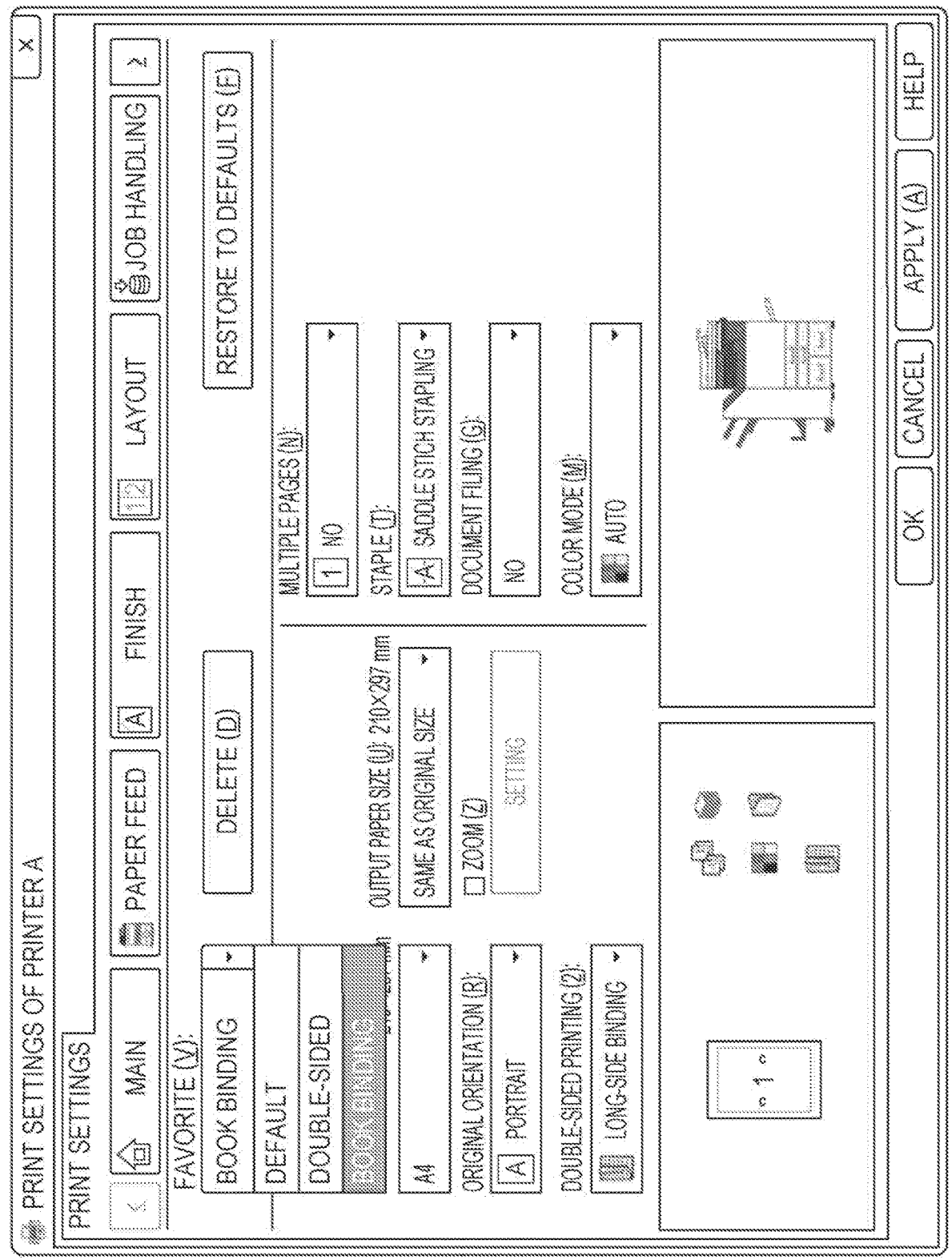
FIG. 13 illustrates a screen for print setting displayed by the information processing apparatus in a case where the "default", the "double-sided", and "book binding" are displayed as "favorites" that are selectable in the favorite list, according to the first embodiment of the disclosure.

FIG. 13 illustrates the favorite list obtained after further adding a favorite with a name of "book binding" while the post-processing apparatus K (saddle finisher) is being attached to the multifunction apparatus main body. In this state, the favorite of the "default", the favorite of the "double-sided", and the favorite of the "book binding" are displayed so as to be selectable in the favorite list.

Figure 14:
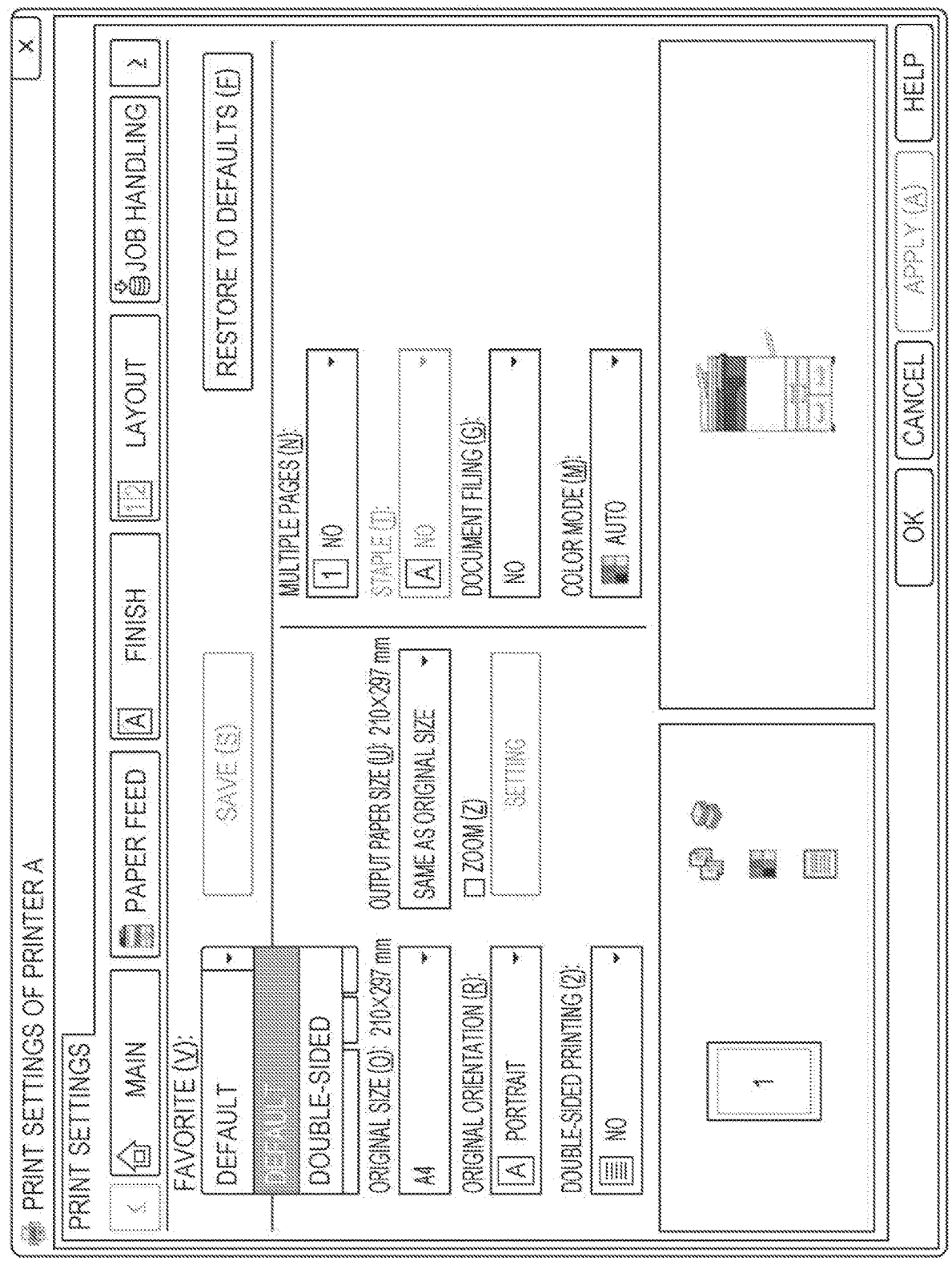
FIG. 14 illustrates a screen for print setting displayed by the information processing apparatus in a case where the "default" and the "double-sided" are displayed as "favorites" that are selectable in the favorite list after the screen of FIG. 13 is displayed, according to the first embodiment of the disclosure.

FIG. 14 illustrates the favorite list obtained after detaching the post-processing apparatus K (saddle finisher) from the multifunction apparatus main body. The "saddle stich stapling" that is the function used in the favorite of the "book binding" has been able to be provided by the post-processing apparatus K (saddle finisher), but after the post-processing apparatus K (saddle finisher) is detached and another optional apparatus that is able to provide the function is not connected to the multifunction apparatus main body, resulting that the function is no longer provided. This is determined by the processing described above and the favorite of the "book binding" is deleted from the favorite list.

When the favorite of the "book binding" remains in the favorite list, there is a case where the user erroneously selects the "book binding", but the favorite of the "book binding" is deleted from the favorite list by the processing according to the present embodiment, and therefore such a case is able to be avoided.

Second Embodiment

Figure 15:
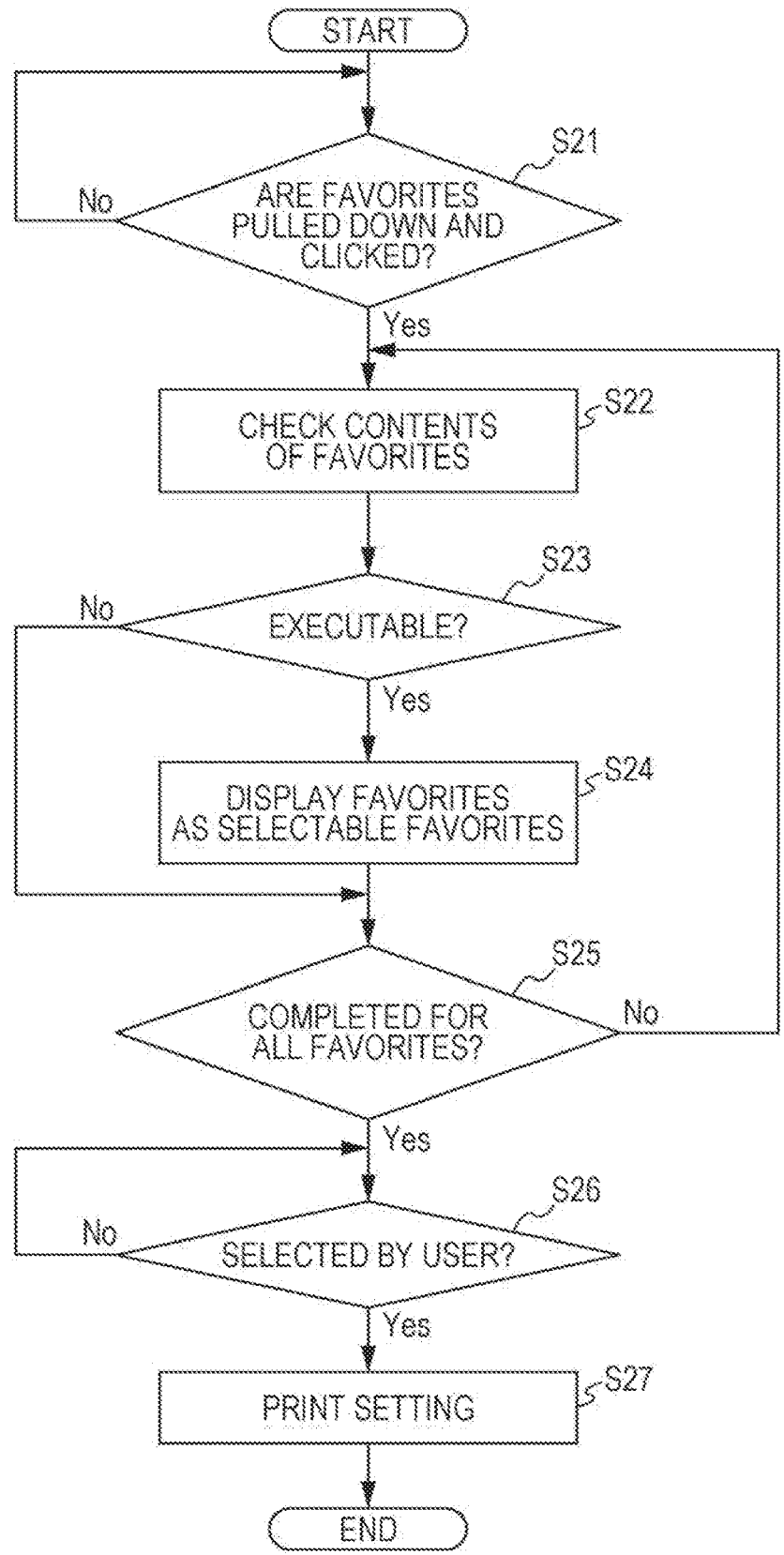
FIG. 15 is a flowchart for explaining an operation from when a favorite list is displayed till when setting corresponding to a selected favorite is set to the multifunction apparatus main body or the multifunction apparatus main body and an optional apparatus, according to a second embodiment of the disclosure.

FIG. 15 is a flowchart for explaining an operation from when a favorite list is displayed till when setting corresponding to a selected favorite is set to the multifunction apparatus main body or the multifunction apparatus main body and an optional apparatus, according to a second embodiment.

In a case where an arrow mark for opening a favorite list is selected (YES at step S21), when all "favorites" that are registered are executable, the "favorites" are displayed so as to be selectable in the favorite list (steps S22, S23, S24, and S25). When any of the "favorites" selectable in the favorite list is selected by the user (YES at step S26), setting corresponding to the selected "favorite" is set to the multifunction apparatus main body or the multifunction apparatus main body and the optional apparatus (step S27).

Here, whether to be executable is determined in a similar manner to that in step S3 of the first embodiment.

In the second embodiment, it is not necessary to provide the field of the "display/non-display" in the favorite table.

Third Embodiment

A third embodiment relates to processing when the number of "favorites" reaches a predetermined number.

Figure 16:
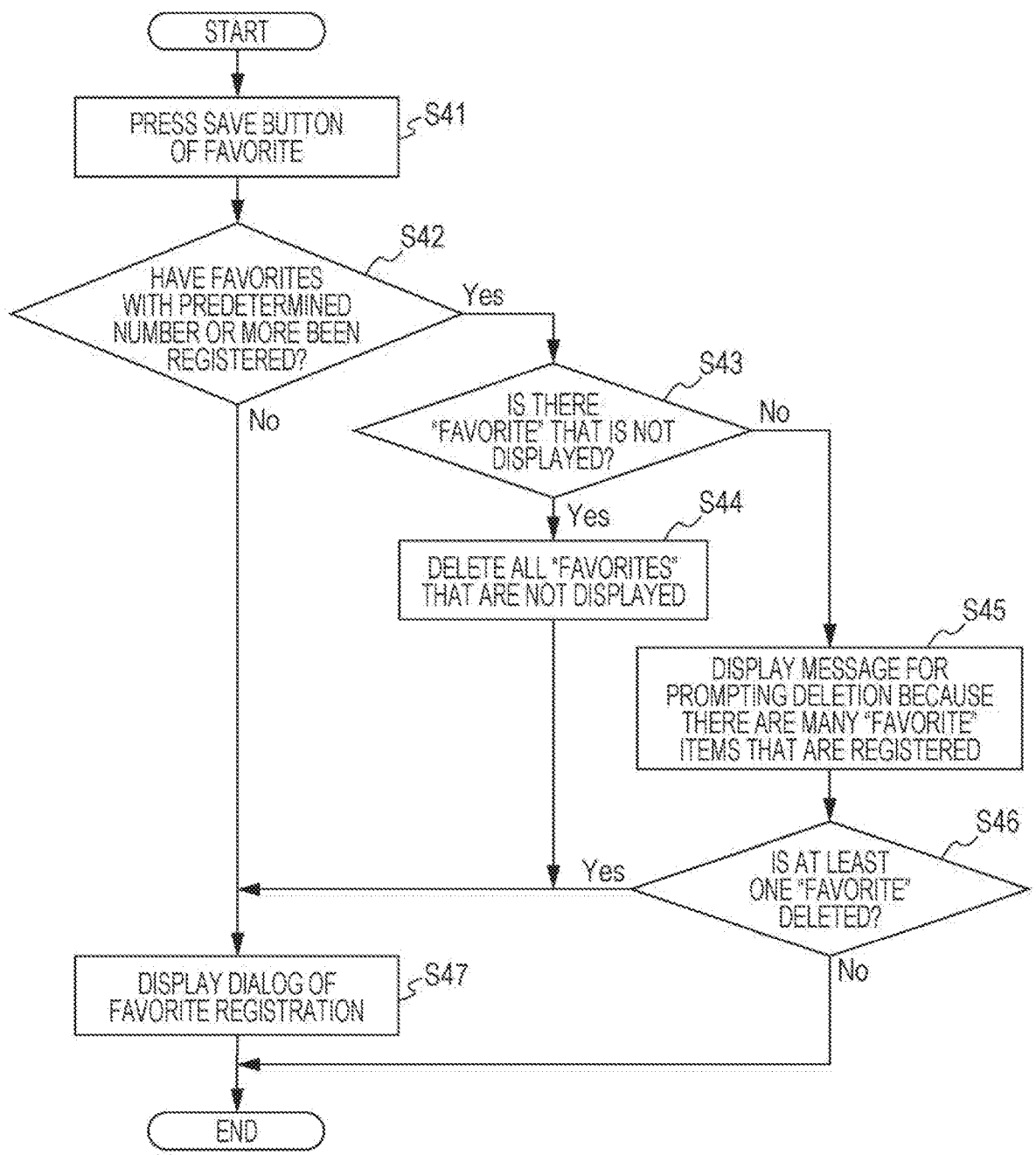
FIG. 16 is a flowchart for explaining an operation of a method of registering a new "favorite" when the number of "favorites" that are registered is a predetermined number or more, according to a third embodiment of the disclosure.

With reference to FIG. 16, when a button for saving a favorite is pressed (step S41), whether or not "favorites"

with the predetermined number or more have been registered is checked (step S42). As the predetermined number, 30 is set, for example.

When "favorites" with the predetermined number or more are not set (NO at step S42), a dialog of favorite registration is directly displayed (step S47). At step S47, a new "favorite" is registered in accordance with an operation of the user for the dialog.

When "favorites" with the predetermined number or more are set (YES at step S42), whether there is at least one "favorite" that is not displayed is checked, and when there is such a "favorite" (YES at step S43), all "favorites" that are not displayed are deleted (step S44) and the procedure then proceeds to step S47. At step S47, a new "favorite" is registered in accordance with an operation of the user for the dialog.

When there is no "favorite" that is not displayed (NO at step S43), a message for prompting to delete any "favorite" that is registered is displayed, and when one or more "favorites" are deleted (YES at step S46), the procedure proceeds to step S47. At step S47, a new "favorite" is registered in accordance with an operation of the user for the dialog. When no "favorite" is deleted (NO at step S46), the processing ends.

Fourth Embodiment

A fourth embodiment relates to processing when a name of a "favorite" to be newly registered is overlapped with a name of an existing "favorite".

Figure 17:
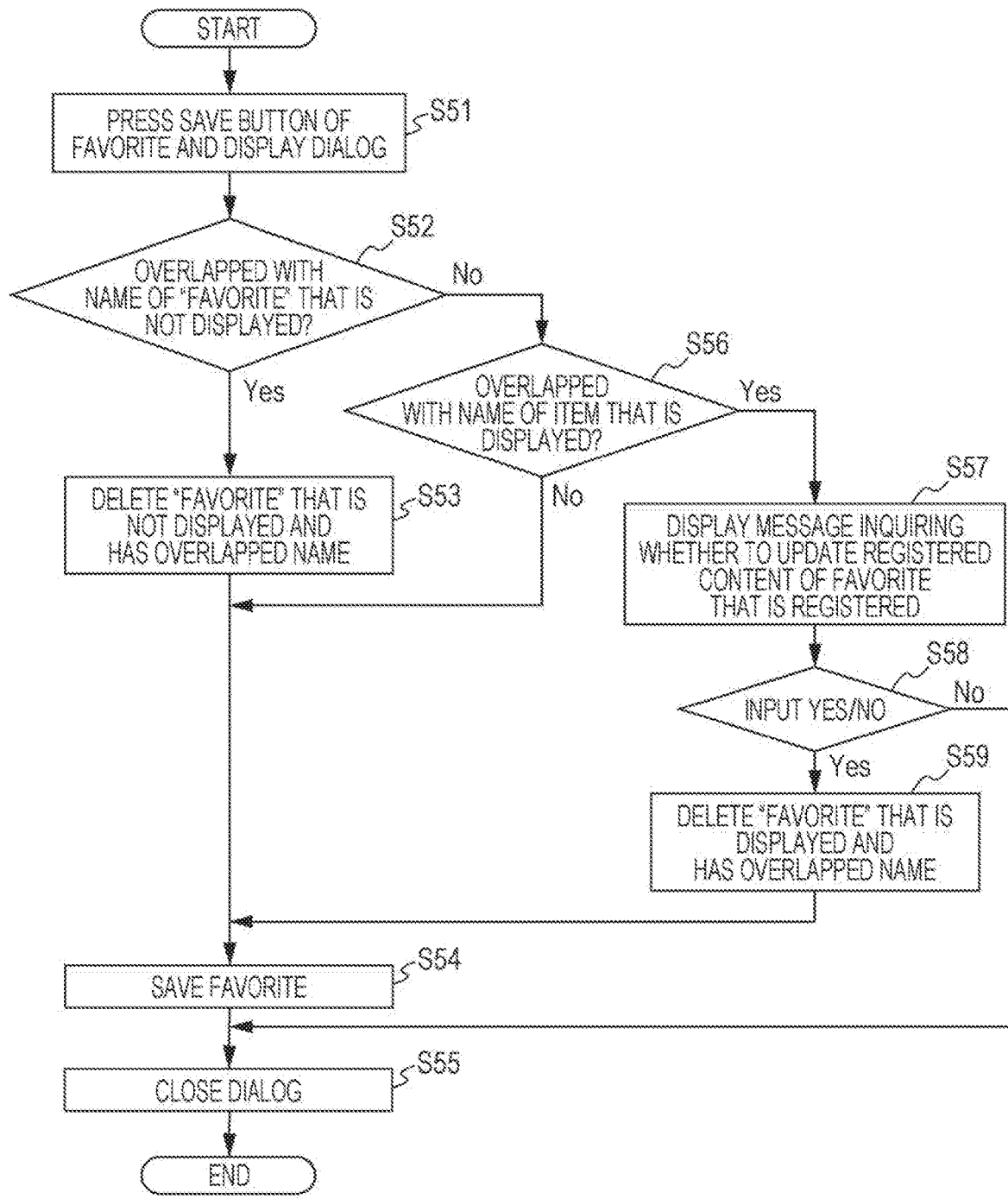
FIG. 17 is a flowchart for explaining an operation of a method of registering a "favorite" when a "favorite" whose name is overlapped with a name of a "favorite" to be registered has been already registered, according to a fourth embodiment of the disclosure.

With reference to FIG. 17, when a save button of a "favorite" is pressed, a dialog is displayed (step S51).

When a name of the "favorite" to be saved is overlapped with a name of an existing "favorite" that is not displayed (YES at step S52), the existing "favorite" that is not displayed and has the overlapped name is deleted (step S53), and then, the "favorite" to be saved is saved (step S54) and the dialog is closed (step S55). Thereby, a previous content of the "favorite" having the same name is replaced with a new content.

When the name of the "favorite" to be saved is not overlapped with a name of an existing "favorite" that is not displayed (NO at step S52), whether or not the name of the "favorite" to be saved is overlapped with a name of an existing "favorite" that is displayed is determined, and when the names are not overlapped (NO at step S56), the "favorite" to be saved is saved (step S54) and the dialog is closed (step S55).

When the name of the "favorite" to be saved is not overlapped with a name of an existing "favorite" that is not displayed (NO at step S52), whether or not the name of the "favorite" to be saved is overlapped with a name of an existing "favorite" that is displayed is determined, and when the names are overlapped (YES at step S56), a message for inquiring whether the existing "favorite" that is displayed and has the overlapped name may be updated by the "favorite" to be saved is displayed (step S57), and when YES is input, the existing "favorite" that is displayed and has the overlapped name is deleted (step S59), and then, the "favorite" to be saved is saved (step S54) and the dialog is closed (step S55). Thereby, a previous content of the "favorite" having the same name is replaced with a new content.

Fifth Embodiment

In the first through fourth embodiments, a "favorite" to be displayed is displayed so as to be selectable in a favorite list and a "favorite" not to be displayed is not displayed in the favorite list.

On the other hand, a fifth embodiment is the same as the first through fourth embodiments in that a "favorite" to be displayed is displayed so as to be selectable in a favorite list. In the fifth embodiment, however, a "favorite" not to be displayed in the first embodiment is displayed so as not to be selectable in a favorite list. Being displayed so as not to be selectable means that, even when the "favorite" is displayed, the "favorite" is displayed in such a manner that the user is not able to select the "favorite" and is displayed in a form (for example, displayed in a grayed out manner) different from that of a "favorite" displayed so as to be selectable.

Sixth Embodiment

Figure 18:
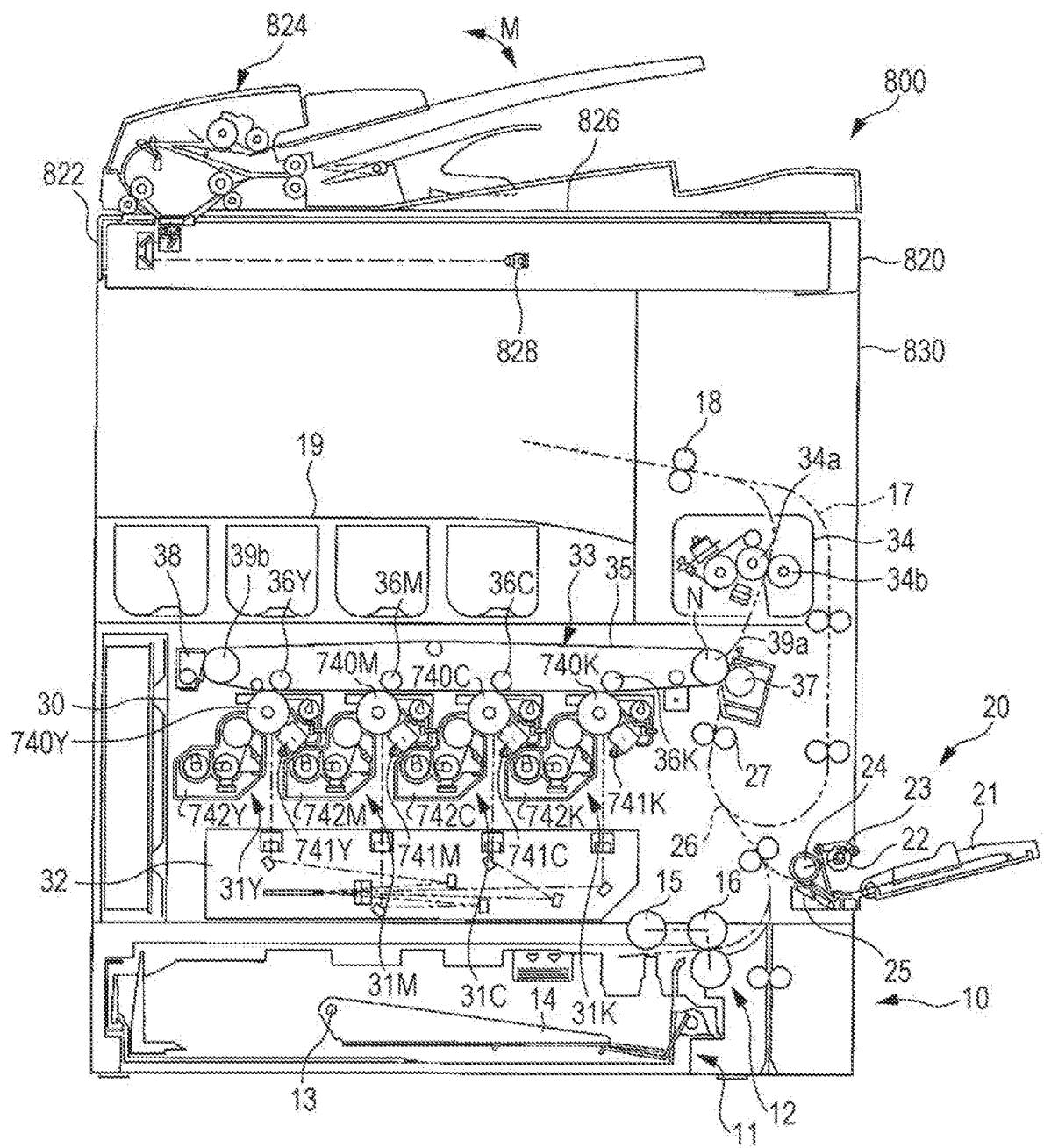
FIG. 18 is a conceptual sectional view of a multifunction apparatus according to a sixth embodiment of the disclosure.
Figure 19:
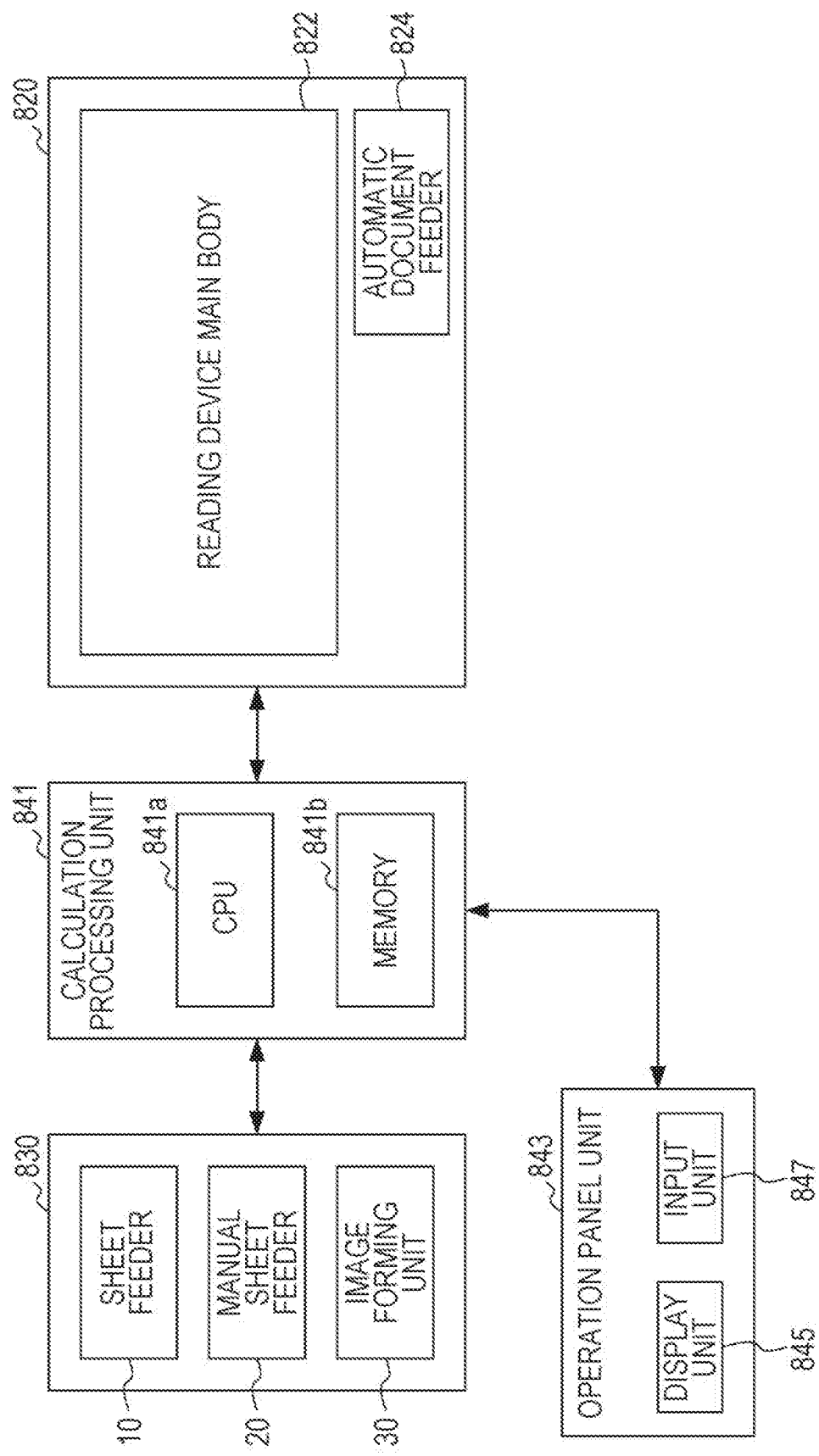
FIG. 19 is a functional block diagram of the multifunction apparatus according to the sixth embodiment of the disclosure.

A sixth embodiment relates to a multifunction apparatus 800 that is a kind of image output apparatus according to the first through fifth embodiments. FIGS. 18 and 19 illustrate a configuration of the multifunction apparatus 800 and the like.

As illustrated in FIGS. 18 and 19, the multifunction apparatus 800 includes a document reading device 820 that reads an image of a document, a multifunction apparatus main body (image forming unit main body) 830 that forms the image on a sheet, an operation panel unit 843 by which the document reading device 820 and the multifunction apparatus main body 830 are operated, and a calculation processing unit 841 that controls the document reading device 820 and the multifunction apparatus main body 830 in accordance with an operation by the operation panel unit 843.

The document reading device 820 is able to be used alone for image reading, the multifunction apparatus main body 830 is able to be used alone for image formation, and, in addition, the document reading device 820 and the multifunction apparatus main body 830 are able to cooperate with each other for copying an image. The multifunction apparatus 800 may include a storage device and a facsimile device that are not illustrated. The storage device is able to store an image read by the document reading device 820 or an image received by the facsimile device. The facsimile device is able to transmit an image read by the document reading device 820 or an image stored in the storage device and receive an image from outside. Furthermore, the multifunction apparatus 800 may include an interface for connecting to a personal computer via a network. The personal computer connected to the multifunction apparatus 800 is able to use a function of the multifunction apparatus for data that is able to be managed by the personal computer.

The document reading device 820 includes an automatic document feeder SPF (single pass feeder) 824 that automatically feeds a document and a reading device main body 822 that reads an image of the document. Note that, the document reading device 820 includes, in addition to the components illustrated in FIG. 19, components that are not illustrated in FIG. 19 but illustrated in FIG. 18. As illustrated in FIG. 18, the reading device main body 822 is provided with a document platen 826.

The multifunction apparatus main body 830 includes a sheet feeder 10 that feeds a sheet, a manual sheet feeder 20 that enables manual sheet feeding, and an image forming unit 30 that forms an image on a sheet fed by the sheet feeder 10 or the manual sheet feeder 20.

The sheet feeder 10 includes a sheet stacking unit 11 in which sheets are stacked and a separating feeder 12 that separately feeds, one by one, the sheets stacked in the sheet stacking unit 11. The sheet stacking unit 11 includes a middle plate 14 that pivots with a rotational shaft 13 as a center and the middle plate 14 pivots and lifts up a sheet when feeding the sheet. The separating feeder 12 includes a pick-up roller 15 that feeds the sheet lifted up by the middle plate 14, and a separating roller pair 16 that separates, one by one, sheets fed by the pick-up roller 15.

The manual sheet feeder 20 includes a manual feed tray 21 in which sheets are able to be stacked and a separating feeder 22 that separately feeds, one by one, the sheets stacked in the manual feed tray 21. The manual feed tray 21 is supported by the multifunction peripheral main body 830 so as to pivot freely and is fixed at a predetermined angle so as to allow stacking of a sheet when the sheet is fed manually. The separating feeder 22 includes a pick-up roller 23 that feeds sheets stacked in the manual feed tray 21 and a separating roller 24 and a separating pad 25 that separate, one by one, the sheets fed by the pick-up roller 23.

The image forming unit 30 includes four process cartridges 31Y to 31K that form yellow (Y), magenta (M), cyan (C), and black (K) images, photosensitive drums 740Y to 740K described below, an exposure device 32 by which surfaces of the photosensitive drums 740Y to 740K are exposed to light, a transfer unit 33 that transfers toner images formed on the surfaces of the photosensitive drums 740Y to 740K to a sheet, and a fixing unit 34 that fixes the transferred toner images to the sheet. Note that, the alphabetical characters (Y, M, C, and K) which suffix the reference numerals represent the respective colors (yellow, magenta, cyan, and black).

Each of the four process cartridges 31Y to 31K is formed to be detachable from the multifunction apparatus main body 830 and is replaceable. Note that, the four process cartridges 31Y to 31K are formed to have similar configurations except for a color used to form an image. Thus, only a configuration of the process cartridge 31Y that forms an image of yellow (Y) will be described, and description for the process cartridges 31M to 31K will be omitted.

The process cartridge 31Y includes the photosensitive drum 740Y as an image bearing member, a charger 741Y that charges the photosensitive drum 740Y, a developing device 742Y that develops an electrostatic latent image formed on the photosensitive drum 740Y, and a drum cleaner that removes toner remaining on the surface of the photosensitive drum 740Y. The developing device 742Y includes a developing device main body (not illustrated in detail) that performs development on the photosensitive drum 740Y, and a toner cartridge (not illustrated in detail) that supplies toner to the developing device main body. The toner cartridge is formed to be detachable from the developing device main body and is able to be removed from the developing device main body and replaced when the contained toner is exhausted.

The exposure device 32 includes a light source (not illustrated) that emits a laser beam, a plurality of mirrors (not illustrated) that guide the laser beam to the photosensitive drums 740Y to 740K, and the like. The transfer unit 33 includes an intermediate transfer belt 35 that bears toner images formed on the photosensitive drums 740Y to 740K, primary transfer rollers 36Y to 36K that primarily transfer the toner images formed on the photosensitive drums 740Y to 740K to the intermediate transfer belt 35, a secondary transfer roller 37 that secondarily transfers a toner image transferred to the intermediate transfer belt 35 to a sheet, and a belt cleaner 38 that removes toner remaining on the intermediate transfer belt 35. The intermediate transfer belt 35 is wound around a drive roller 39a and a driven roller 39b and pressed against the photosensitive drums 740Y to 740K by the primary transfer rollers 36Y to 36K, respectively. The secondary transfer roller 37 nips (pinches) the intermediate transfer belt 35 with the drive roller 39a and transfers the toner image borne by the intermediate transfer belt 35 to a sheet at a nip portion N. The fixing unit 34 includes a heat roller 34a that heats a sheet and a pressure roller 34b that is in pressure contact with the heat roller 34a.

The operation panel unit 843 includes a display unit 845 that displays predetermined information and an input unit 847 by which a user inputs an instruction to the document reading device 820 and the multifunction apparatus main body 830. In the present embodiment, the operation panel unit 843 is arranged on a front side of the reading device main body 822. Note that, the front side corresponds to a front side of the sheet of FIG. 18 and a back side corresponds to a back side of the sheet of FIG. 18.

As illustrated in FIG. 19, the calculation processing unit 841 includes a CPU 841a that controls driving of the sheet feeder 10, the manual sheet feeder 20, the image forming unit 30, and the document reading device 820, and a memory 841b that stores various programs to operate the CPU 841a and various kinds of information and the like that are used by the CPU 841a. The calculation processing unit 841 forms an image on a sheet by integrally controlling operations of the sheet feeder 10, the manual sheet feeder 20, the image forming unit 30, and the document reading device 820 in accordance with an operation on the operation panel unit 843 by the user.

Next, an image forming operation (image formation control by the calculation processing unit 841) by the multifunction apparatus main body 800 configured as described above will be described. In the present embodiment, an image forming operation in which the image forming unit 30 forms, on a sheet fed by the sheet feeder 10, an image of a document that is fed by the automatic document feeder 824 and read by the reading device main body 822 will be described as an example.

When an image formation starting signal is transmitted upon an input by the user to the input unit 847 of the operation panel unit 843, a document that is placed on the automatic document feeder 824 by the user and is read is automatically fed toward a document reading position, and an image thereof is read at a document reading position by the reading device main body 822.

When the image of the document is read by the reading device main body 822, the exposure device 32 radiates a plurality of laser beams to the corresponding photosensitive drums 740Y to 740K in accordance with image information of the document that is read. At this time, the photosensitive drums 740Y to 740K are respectively charged in advance by the chargers 741Y to 741K, and electrostatic latent images are formed on the respective photosensitive drums 740Y to 740K by the irradiation with corresponding laser beams. Subsequently, the electrostatic latent images formed on the respective photosensitive drums 740Y to 740K are developed by the developing devices 742Y to 742K, and toner images of yellow (Y), magenta (M), cyan (C), and black (K) are formed on the photosensitive drums 740Y to 740K. The toner images of the respective colors formed on the photosensitive drums 740Y to 740K are transferred by the primary transfer rollers 36Y to 36K to the intermediate transfer belt 35 to be superimposed with each other, and the transferred and superimposed toner images (a full-color toner image) are conveyed to the nip portion N while being borne by the intermediate transfer belt 35.

In parallel with the image forming operation described above, sheets stacked in the sheet stacking unit 11 are fed to a sheet conveyance path 26 by the pick-up roller 15 while being separated one by one by the separating feeder 12. An obliquely conveyed sheet is corrected at a resist roller pair 27 provided on an upstream side of the nip portion N in a sheet conveyance direction and conveyed to the nip portion N at a predetermined timing. The full-color toner image borne by the intermediate transfer belt 35 is transferred by the secondary transfer roller 37 to the sheet conveyed to the nip portion N.

The sheet to which the toner image is transferred is heated and pressed in the fixing unit 34, and the toner image is melted and fixed, and then, the sheet is discharged outside to the apparatus by a discharge roller pair 18. The sheet discharged to outside the apparatus is stacked in a discharge sheet stacking unit 19.

Note that, in a case of forming images on both sides (a first side and a second side) of a sheet, before the sheet on the first side of which an image has been formed is discharged to outside the apparatus, the sheet is conveyed to a duplex conveyance path 17 by reversely rotating the discharge roller pair 18 and conveyed again to the image forming unit 30 along the duplex transport path 17. Then, an image is formed on the second side in a similar manner to that of the first side, and the sheet is discharged to outside the apparatus. The sheet discharged to outside the apparatus is stacked in the discharge sheet stacking unit 19.

Note that, the aforementioned information processing apparatus can be realized by hardware, software, or a combination thereof. A display method performed by the aforementioned information processing apparatus can also be realized by hardware, software, or a combination thereof. Realization by software mentioned here indicates realization by a computer that reads and executes a program. A printer is normally used as the program, but there is no limitation thereto.

The program can be stored in various types of non-transitory computer readable media and supplied to the computer. The non-transitory computer readable media include various types of tangible storage media. Examples of the non-transitory computer readable media include a magnetic recording medium (for example, a flexible disk, a magnetic tape, or a hard-disk drive), a magneto-optical recording medium (for example, a magneto-optical disk), a CD-ROM (Read Only Memory), a CD-R, a CD-R/W, a semiconductor memory (for example, a mask ROM, a PROM (Programmable ROM), an EPROM (Erasable PROM), a flash ROM, or a RAM (Random Access Memory). The program may be supplied to the computer by various types of transitory computer readable media. Examples of the transitory computer readable media include an electric signal, an optical signal, and an electromagnetic wave. The transitory computer readable medium can supply the program via a wired transmission path, such as electric wires or optical fibers, or via a wireless transmission path.

The disclosure can be embodied in other different forms without departing from the spirit and principal characteristics thereof. Therefore, the above-described embodiments are to be considered as illustrative and not restrictive. The scope of the disclosure is indicated by the scope of the claims rather than by the description. All variations and modifications falling within the equivalency range of the claims are intended to be embraced therein.

The disclosure is able to be utilized for display of a "favorite" by which one or more functions provided by an apparatus are collectively selected.

The present disclosure contains subject matter related to that disclosed in Japanese Priority Patent Application JP 2018-080212 filed in the Japan Patent Office on Apr. 18, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that displays, in a favorite list, one or more "favorites" by which one or more functions are collectively selected, the one or more functions being able to be provided by a multifunction apparatus alone or a combination of the multifunction apparatus and one or more optional apparatuses connected to the multifunction apparatus, wherein
 whether or not each of the one or more "favorites" is executable is determined,
 in a favorite table in which the one or more "favorites" are registered, a "favorite" in the one or more "favorites" is set to "display", the "favorite" being assigned to a function that is determined to be executable by the multifunction apparatus alone or the combination of the multifunction apparatus and one or more optional apparatuses connected to the multifunction apparatus,
 in the favorite table, a "favorite" in the one or more "favorites" is set to "non-display", the "favorite" being assigned to a function that is determined not to be executable by the multifunction apparatus alone or the combination of the multifunction apparatus and one or more optional apparatuses connected to the multifunction apparatus, and
 the "favorite" that is set to the "display" is displayed in the favorite list so as to be selectable and the "favorite" that is set to the "non-display" is not displayed in the favorite list.

2. The information processing apparatus according to claim 1, wherein
 whether or not each of the one or more "favorites" is executable is determined on a basis of a connection state, to the multifunction apparatus, of each of the one or more optional apparatuses that provide one or more functions selected by each of the one or more "favorites".

3. The information processing apparatus according to claim 1, wherein
 whether or not a "favorite" is executable is determined on a basis of
 a list of one or more functions included in the "favorite",
 a list of one or more functions that are able to be provided by each of the one or more optional apparatuses, and
 information about whether or not each of the one or more optional apparatuses is connected to the multifunction apparatus.

4. The information processing apparatus according to claim 1, wherein
 setting about whether or not to display each of the one or more "favorites" so as to be selectable in the favorite list is performed when a connection state, to the multifunction apparatus, of the one or more optional apparatuses is changed.

5. The information processing apparatus according to claim 4, wherein
 the setting about whether or not to display each of the one or more "favorites" so as to be selectable in the favorite list is saved, the setting being performed when the connection state of the one or more optional apparatuses to the multifunction apparatus is changed, and the setting saved is referred to when the favorite list is displayed.

6. The information processing apparatus according to claim 4, wherein
when the number of the one or more "favorites" reaches a predetermined value, a "favorite" that is not subjected to the setting to display so as to be selectable is deleted irrespective of permission by a user.

7. The information processing apparatus according to claim 4, wherein
when the number of the one or more "favorites" reaches a predetermined value, a "favorite" that is subjected to the setting to display so as to be selectable is deleted under a condition that permission is given by a user.

8. The information processing apparatus according to claim 4, wherein
in a case where a name of a "favorite" to be newly registered is identical to a name of a "favorite" that is not subjected to the setting to display so as to be selectable, the "favorite" that is not subjected to the setting to display so as to be selectable is replaced with the "favorite" to be newly registered, irrespective of permission by a user.

9. The information processing apparatus according to claim 4, wherein
in a case where a name of a "favorite" to be newly registered is identical to a name of a "favorite" that is subjected to the setting to display so as to be selectable, the "favorite" that is subjected to the setting to display so as to be selectable is replaced with the "favorite" to be newly registered, under a condition that permission is given by a user.

10. The information processing apparatus according to claim 1, wherein determination about whether or not each of the one or more "favorites" is executable based on a connection state, to the multifunction apparatus, of the one or more optional apparatuses is performed when an operation of displaying the favorite list is performed.

11. A non-transitory computer-readable storage medium in which a program causing the information processing apparatus according to claim 1 to function as the information processing apparatus is stored.

12. The non-transitory computer-readable storage medium according claim 11, wherein the program is a printer driver.

13. An information processing apparatus that displays, in a favorite list, one or more "favorites" by which one or more functions are collectively selected, the one or more functions being able to be provided by a multifunction apparatus alone or a combination of the multifunction apparatus and one or more optional apparatuses connected to the multifunction apparatus, wherein
whether or not each of the one or more "favorites" is executable is determined,
in a favorite table in which the one or more "favorites" are registered, a "favorite" in the one or more "favorites" is set to "display", the "favorite" being assigned to a function that is determined to be executable by the multifunction apparatus alone or the combination of the multifunction apparatus and one or more optional apparatuses connected to the multifunction apparatus,
in the favorite table, a "favorite" in the one or more "favorites" is set to "non-displa 7", the "favorite" being assigned to a function that is determined not to be executable by the multifunction apparatus alone or the combination of the multifunction apparatus and one or more optional apparatuses connected to the multifunction apparatus, and
the "favorite" that is set to the "display" is displayed in the favorite list so as to be selectable and the "favorite" that is set to the "non-display" is displayed in the favorite list so as not to be selectable and so as to be distinguished from the "favorite" that is set to be the "display".

14. The information processing apparatus according to claim 13, wherein
whether or not each of the one or more "favorites" is executable is determined on a basis of a connection state, to the multifunction apparatus, of each of the one or more optional apparatuses that provide one or more functions selected by each of the one or more "favorites".

15. The information processing apparatus according to claim 13, wherein
whether or not a "favorite" is executable is determined on a basis of
a list of one or more functions included in the "favorite",
a list of one or more functions that are able to be provided by each of the one or more optional apparatuses, and
information about whether or not each of the one or more optional apparatuses is connected to the multifunction apparatus.

16. The information processing apparatus according to claim 13, wherein
setting about whether or not to display each of the one or more "favorites" so as to be selectable in the favorite list is performed when a connection state, to the multifunction apparatus, of the one or more optional apparatuses is changed.

17. The information processing apparatus according to claim 16, wherein
the setting about whether or not to display each of the one or more "favorites" so as to be selectable in the favorite list is saved, the setting being performed when the connection state of the one or more optional apparatuses to the multifunction apparatus is changed, and
the setting saved is referred to when the favorite list is displayed.

18. The information processing apparatus according to claim 16, wherein
when the number of the one or more "favorites" reaches a predetermined value, a "favorite" that is not subjected to the setting to display so as to be selectable is deleted irrespective of permission by a user.

19. The information processing apparatus according to claim 16, wherein
when the number of the one or more "favorites" reaches a predetermined value, a "favorite" that is subjected to the setting to display so as to be selectable is deleted under a condition that permission is given by a user.

20. The information processing apparatus according to claim 16, wherein
in a case where a name of a "favorite" to be newly registered is identical to a name of a "favorite" that is not subjected to the setting to display so as to be selectable, the "favorite" that is not subjected to the setting to display so as to be selectable is replaced with the "favorite" to be newly registered, irrespective of permission by a user.

21. The information processing apparatus according to claim 16, wherein in a case where a name of a "favorite" to be newly registered is identical to a name of a "favorite" that is subjected to the setting to display so as to be selectable, the "favorite" that is subjected to the setting to display so as to be selectable is replaced with the "favorite" to be newly registered, under a condition that permission is given by a user.

22. The information processing apparatus according to claim 13, wherein
determination about whether or not each of the one or more "favorites" is executable based on a connection state, to the multifunction apparatus, of the one or more optional apparatuses is performed when an operation of displaying the favorite list is performed.

23. A non-transitory computer-readable storage medium in which a program causing the information processing apparatus according to claim 13 to function as the information processing apparatus is stored.

24. The non-transitory computer-readable storage medium according to claim 23, wherein the program is a printer driver.

25. A display method that displays, in a favorite list, one or more "favorites" by which one or more functions are collectively selected, the one or more functions being able to be provided by a multifunction apparatus alone or a combination of the multifunction apparatus and one or more optional apparatuses connected to the multifunction apparatus, the display method comprising
determining whether or not each of the one or more "favorites" is executable on a basis of a connection state, to the multifunction apparatus, of each of the one or more optional apparatuses that provide one or more functions selected by each of the one or more "favorites",
in a favorite table in which the one or more "favorites" are registered, setting a "favorite" in the one or more "favorites" to "display", the "favorite" being assigned to a function that is determined to be executable by the multifunction apparatus alone or the combination of the multifunction apparatus and one or more optional apparatuses connected to the multifunction apparatus,
in the favorite table, setting a "favorite" in the one or more "favorites" to "non-display", the "favorite" being assigned to a function that is determined not to be executable by the multifunction apparatus alone or the combination of the multifunction apparatus and one or more optional apparatuses connected to the multifunction apparatus, and
displaying the "favorite" that is set to the "display" in the favorite list so as to be selectable and not displaying the "favorite" that is set to the "non-display" in the favorite list.

26. A display method that displays, in a favorite list, one or more "favorites" by which one or more functions are collectively selected, the one or more functions being able to be provided by a multifunction apparatus alone or a combination of the multifunction apparatus and one or more optional apparatuses connected to the multifunction apparatus, the display method comprising
determining whether or not each of the one or more "favorites" is executable on a basis of a connection state, to the multifunction apparatus, of each of the one or more optional apparatuses that provide one or more functions selected by each of the one or more "favorites",
in a favorite table in which the one or more "favorites" are registered, setting a "favorite" in the one or more "favorites" to "display" the "favorite" being assigned to a function that is determined to be executable by the multifunction apparatus alone or the combination of the multifunction apparatus and one or more optional apparatuses connected to the multifunction apparatus,
in the favorite table, setting a "favorite" in the one or more "favorites" to "non-display", the "favorite" being assigned to a function that is determined not to be executable by the multifunction apparatus alone or the combination of the multifunction apparatus and one or more optional apparatuses connected to the multifunction apparatus, and
displaying the "favorite" that is set to the "non-display" in the favorite list so as not to be selectable and so as to be distinguished from the "favorite" that is set to be the "display".

\* \* \* \* \*